(12) United States Patent
Karame et al.

(10) Patent No.: US 11,128,603 B2
(45) Date of Patent: Sep. 21, 2021

(54) METHOD AND SYSTEM FOR PROVIDING A TRANSACTION FORWARDING SERVICE IN BLOCKCHAIN IMPLEMENTATIONS

(71) Applicant: NEC Europe Ltd., Heidelberg (DE)

(72) Inventors: Ghassan Karame, Heidelberg (DE); Damian Gruber, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 15/281,236

(22) Filed: Sep. 30, 2016

(65) Prior Publication Data
US 2018/0097779 A1    Apr. 5, 2018

(51) Int. Cl.
| | |
|---|---|
| *H04L 29/06* | (2006.01) |
| *H04L 9/32* | (2006.01) |
| *G06Q 20/06* | (2012.01) |
| *G06Q 20/40* | (2012.01) |
| *G06Q 20/38* | (2012.01) |
| *G06Q 20/02* | (2012.01) |

(52) U.S. Cl.
CPC ......... *H04L 63/0421* (2013.01); *G06Q 20/02* (2013.01); *G06Q 20/065* (2013.01); *G06Q 20/382* (2013.01); *G06Q 20/405* (2013.01); *H04L 9/3236* (2013.01); *H04L 9/3247* (2013.01); *H04L 63/1458* (2013.01); *G06Q 2220/00* (2013.01); *H04L 2463/121* (2013.01)

(58) Field of Classification Search
CPC . H04L 63/0421; H04L 9/3236; H04L 9/3247; H04L 63/1458; H04L 2463/121; G06Q 20/065; G06Q 20/382; G06Q 2220/00
See application file for complete search history.

(56) References Cited

U.S. PATENT DOCUMENTS

| | | | | |
|---|---|---|---|---|
| 10,735,193 | B1 * | 8/2020 | Knas | ............. H04L 9/0861 |
| 10,805,089 | B1 * | 10/2020 | Yu | ............. H04L 9/3247 |
| 2015/0379510 | A1 * | 12/2015 | Smith | ............. G06Q 20/3829 |
| | | | | 705/71 |
| 2016/0330034 | A1 * | 11/2016 | Back | ............. G06Q 20/06 |

(Continued)

OTHER PUBLICATIONS

Deanonymisation of clients in Bitcoin P2P network, Biryukov et al, Jul. 2014 (Year: 2014).*

(Continued)

*Primary Examiner* — Jahangir Kabir
(74) *Attorney, Agent, or Firm* — Leydig, Voit & Mayer, Ltd.

(57) ABSTRACT

A method of providing a transaction forwarding service in a blockchain includes executing a smart contract in the blockchain so as to determine whether a respective full node is eligible to execute the smart contract. The smart contract specifies eligible full nodes, a filter of a respective light client and a reward for executing the smart contract. The respective full node forwards data relating to a transaction that matches the filter of the respective light client to the respective light client with a proof that the transaction is included in the blockchain. The respective full node receives a signed acknowledgement from the respective light client verifying the transaction. Then, the respective full node claims the reward using the acknowledgement.

17 Claims, 3 Drawing Sheets

(56) References Cited

U.S. PATENT DOCUMENTS

| | | | | |
|---|---|---|---|---|
| 2017/0017958 A1* | 1/2017 | Scott | .................. | G06Q 20/40 |
| 2017/0187535 A1* | 6/2017 | Middleton | ............ | H04L 9/3247 |
| 2017/0200137 A1* | 7/2017 | Vilmont | ................ | G06Q 20/10 |
| 2018/0005318 A1* | 1/2018 | Pierce | ................... | G06Q 40/04 |
| 2019/0347651 A1* | 11/2019 | Moreno | .............. | G06Q 20/385 |
| 2020/0099531 A1* | 3/2020 | Chidambaram | ... | G06Q 10/0633 |
| 2020/0218830 A1* | 7/2020 | Topart | ..................... | H04L 9/30 |

OTHER PUBLICATIONS

"Patricia Tree", https://github.com/ethereum/wiki/wiki/Patricia-Tree, Mar. 16-19, 2016, pp. 1-4.

"RANDAO: A DAO working as RNG of Ethereum", https://github.com/randao/randao, Sep. 23, 2016, pp. 1-3.

Peter Todd, [Bitcoin-development] Privacy and blockchain data, https://lists.linuxfoundation.org/pipermail/bitcoin-dev/2014-January/004 . . . , Jan. 6, 2014, pp. 1-5.

Burton H. Bloom, "Space/Time Trade-offs in Hash Coding with Allowable Errors", Communications of the ACM, vol. 13, No. 7, Jul. 1970, pp. 1-5.

Bin Fan, et al., "Cuckoo Filter: Practically Better Than Bloom", Proceedings of the $10^{th}$ ACM International on Conference on emerging Networking Experiments and Technologies, Dec. 2-5, 2014, pp. 75-88.

\* cited by examiner

METHOD AND SYSTEM FOR PROVIDING A TRANSACTION FORWARDING SERVICE IN BLOCKCHAIN IMPLEMENTATIONS

FIELD

The present invention relates to a method and system for use in interactions between full nodes and light clients in blockchain implementations.

BACKGROUND

Light clients run on devices, such as mobile computing devices, smartphones and tablets, with constrained resources, including limited CPU, storage, and bandwidth. These clients neither download nor process an entire blockchain. Instead, the devices rely on full nodes to verify and forward the transactions related to the light client users.

The inventors have recognized that light client privacy is a problem in blockchain implementations. One reason for this is that the identity of the light client devices can be easily exposed to the full nodes through the transactions if address obfuscation is not applied properly. Existing systems either provide no light client privacy at all (e.g., Ethereum), or have privacy additions which are recognized in the present invention as having significant flaws (e.g., Bitcoin). Also, even if address-privacy is intended through the use of filters (e.g., Bloom Filters), full nodes, which apply those filters to transactions, are not compensated by the light clients. In fact, the full nodes spend an excessive amount of resources for light clients, while the light clients do not contribute to the network in any way.

Electrum Bitcoin clients reveal their addresses completely to the full nodes in order to get the related transactions in the network. Though the light clients only have to download and process a minimal amount of data, this allows malicious full nodes to get all transaction information about the user. With bitcoinj, which is another implementation of Bitcoin wallet, thin client addresses are first used to instantiate a Bloom filter, which is then revealed to the full nodes. Since Bloom filters only allow approximate membership tests, the client addresses are hidden among other addresses which are false-positives of the membership tests that the full nodes cannot distinguish. However, the inventors have recognized that the Bloom filter implementation suffers from multiple weaknesses. Current light clients tend to insert multiple elements per address into their filters, resulting in a dramatic decrease of the actual false-positive rate. Furthermore, there exists an extensive set of attacks to classify false-positives. For instance, an adversary can leverage transaction sizes, script types, and clustering heuristics to identify a significant amount of false-positive addresses, and therefore identify the transactions and addresses pertaining to a light client.

In addition to the privacy issues, the inventors have recognized that current transaction forwarding services provided by the full nodes can be exploited in regards to fairness and denial-of-service (DoS) attacks. On one hand, full nodes need to consume an excessive amount of network and computational resources for serving connected light clients. The full nodes have to fetch the whole blockchain from disk, and filter it for each light client. This process can be exploited to launch DoS attacks on the full nodes. In addition, light clients do not compensate full nodes for their services, either financially or with network or computational resources, nor do the light clients support the peer-to-peer (P2P) network in any other way. On the other hand, the light clients are not able to verify if full nodes have withheld some transactions relevant to them, e.g., lie by omission. Where service fees are paid by light clients, it is not assured that the connected full nodes are doing their job correctly.

SUMMARY

In an embodiment, the present invention provides a method of providing a transaction forwarding service in a blockchain. A smart contract is executed in the blockchain so as to determine whether a respective full node is eligible to execute the smart contract. The smart contract specifies eligible full nodes, a filter of a respective light client and a reward for executing the smart contract. The respective full node forwards data relating to a transaction that matches the filter of the respective light client to the respective light client with a proof that the transaction is included in the blockchain. The respective full node receives a signed acknowledgement from the respective light client verifying the transaction. Then, the respective full node claims the reward using the acknowledgement.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
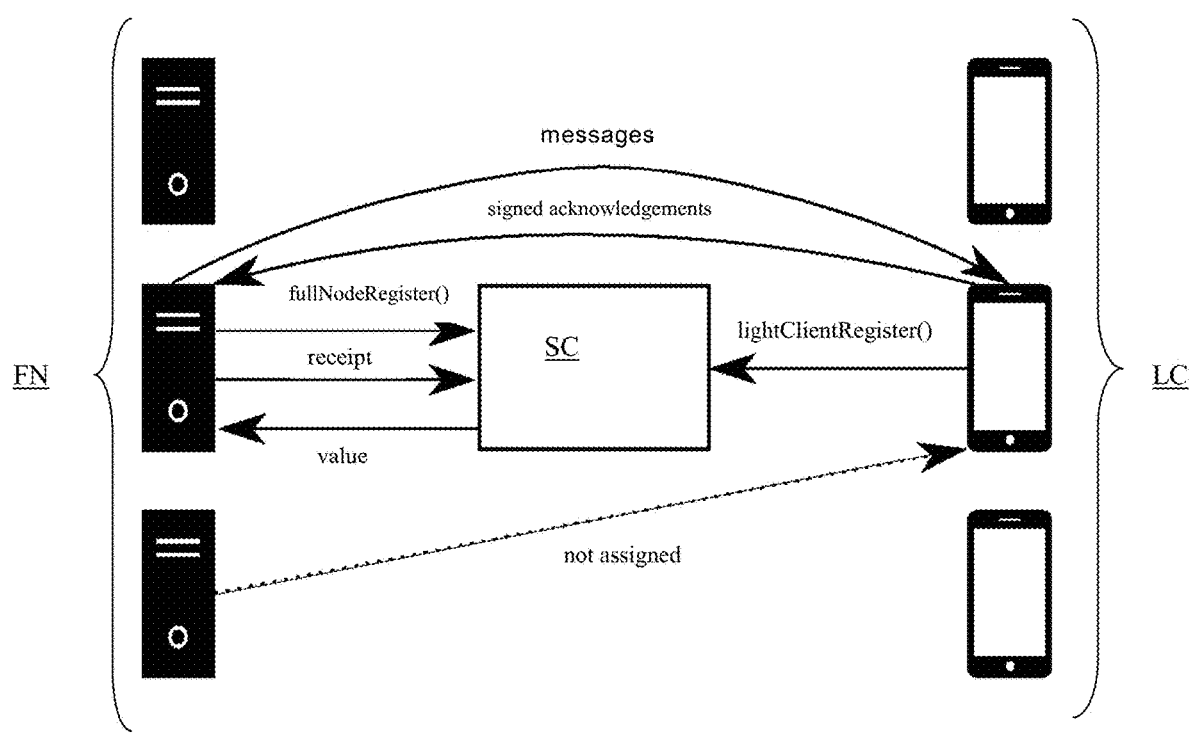
FIG. 1 schematically shows a computer system according to an embodiment of the present invention.

According to an embodiment, the present invention provides a platform which utilizes smart contracts in the blockchain with privacy-preserving filters so as to achieve private, flexible and auditable transaction forwarding services for light clients. This platform also ensures fair payment of the service provided by the full nodes in a manner which helps to prevent DoS attacks to the full nodes as well as free-riders. The smart contracts can be used to deploy the filters on the transactions in the blockchain, assign full nodes to filter and forward the transactions for the light clients and reward full nodes for the filtering service with auditable proofs, for example in the form of sequential signed acknowledgements from the light clients.

Embodiments of the present invention are able to achieve increased flexibility, fairness, DoS protection, correctness and efficiency. In regard to flexibility, the privacy-preserving transaction filtering service is customizable and deployed through smart contracts rather than hard-coded as an off-chain activity. In regard to fairness, the transaction forwarding services offered by the full nodes are rewarded in proportion to the amount of the work done by the full nodes, or the network and computational resources consumed. In regard to DoS Protection, the light clients cannot consume full nodes' resources by bombing the full nodes with filters, because, according to an embodiment, the light clients pay for all entailed computation. In regard to correctness and efficiency, an embodiment provides that, in blockchains where the ledger does not support state storage, the light clients are able to efficiently learn their correct balance while tolerating some malicious full nodes.

A flexible smart contract framework according to an embodiment of the invention therefore addresses light client privacy, while mitigating free-riding by the light client devices. Blockchains, which are distributed databases with continuously growing records, support smart contracts. Smart contracts are computer protocols which are implemented in the blockchains to apply, verify, enforce contractual provisions or rules, or to facilitate the negotiation of a contract. In other words, smart contracts are code which run on the blockchains, which should be the same at every full node, such that the output should be the same for any full node given a same smart contract and a same blockchain. In the context of an embodiment of the invention, full nodes are defined to be blockchain clients, which maintain a full copy of this blockchain. Full nodes comprise at least one server or computing device that preferably stores or has access to the blockchain. Light clients, on the other hand, are software applications which run on constrained devices (e.g., smartphones). The light clients can neither download nor process most of the blockchain. Such light clients rely on full nodes, which pre-process the blockchain for them, and only forward a subset of the data to them.

A model of the computer system according to an embodiment of the invention is depicted in FIG. 1. Full nodes FN register themselves by sending a transaction to the smart contract SC, which is implemented as a computer protocol in the network shared by the full nodes FN and the light clients LC. Light clients LC register themselves at the smart contract SC by sending a filter representing their blockchain addresses. Possible filter types include Bloom filters, Cuckoo filters, and Prefix filters. Further information regarding these filters can be found in Burton H Bloom, "Space/time trade-offs in hash coding with allowable errors" in Communications of the ACM, 13(7):422-426, 1970; Bin Fan, Dave G Andersen, Michael Kaminsky, and Michael D Mitzenmacher, "Cuckoo filter: Practically better than Boom," in Proceedings of the 10th ACM International on Conference on Emerging Networking Experiments and Technologies, pages 75-88. ACM, 2014; and Peter Todd, "Privacy and blockchain data <<linuxfoundation.org/pipermail/bitcoin-dev/2014-January/004019.html>>, January 2014, each of the foregoing being hereby incorporated herein by reference in their entirety.

Further, the light clients LC preferably send their IP address, and attach some amount of the blockchain's internal currency. This amount is added to the client's contract-internal balance stored in the blockchain. In addition, the light clients LC can have the option to specify some servers of the full nodes FN that they want to connect to.

The smart contract SC assigns full nodes FN to light clients LC. In other words, the smart contract SC can be made to specify which full nodes FN are allowed to serve which light clients LC. Full nodes FN pre-process the blockchain for light clients LC, using the filters which can also be specified in the smart contrast by the light clients LC. Such filters obfuscate the clients' addresses by only allowing for approximate membership tests. The light clients LC also preferably set a value they are willing to pay the full nodes FN from their accounts for the transaction forwarding service when they are setting up the smart contract so that the full nodes FN can directly redeem receipts for processing the smart contract according to its terms. Service level agreements can be used to specify payment and other terms.

Preferably, all full nodes FN execute a smart contract SC when it is invoked by the light client LC to see if they are eligible. Based on the terms of the smart contract, even eligible full nodes FN can preferably decline to execute the smart contract. Where a full node is eligible and wants to participate, that full nodes FN iteratively send messages with filtered blockchain data to the light client LC. The light client LC provides the full node FN with a signed acknowledgement. A signed acknowledgement can be essentially a signature which verifies that the light client LC has confirmed that the transaction belongs to it. The signed acknowledgements also can be used define and indicate the amount of the blockchain's currency that the client is willing to pay to the full node FN for the transaction forwarding service. Full nodes FN present such acknowledgments as a receipt to the smart contract SC to claim its reward for providing their computational processing, and the defined amount of currency is subtracted from the clients' balances, and added to the full nodes' balances. The receipt includes all of those acknowledgements which meet the requirements of the smart contract SC and therefore accumulate during the sequential communications to complete the smart contract SC between the full node FN and the light client LC Assignment:

Light clients LC are naturally interested in being connected to full nodes FN which are not colluding. Therefore, full nodes FN are preferably prevented from being able to easily influence to which clients they are assigned. One specific approach is to assign a pseudorandom id to both full nodes FN and clients LC when they register at the smart contract SC. As shown in RANDAO: A DAO working as RNG of Ethereum, <<https://github.com/randao/randao>> (accessed: Sep. 6, 2016), the entirety of which is hereby incorporated herein by reference, there are smart contracts which can provide random number generators.

Assignment is preferably performed in a deterministic, transparent way, based on the pseudorandom ids. The smart contract SC has to make sure that each client is assigned to a sufficient amount of full nodes FN for verification, and preferably also so that misbehaving full nodes FN can be identified as described in further detail below.

Fair Exchange:

Full nodes FN and light clients LC have key pairs consisting of a private and a public key. Blockchain addresses are hashes of those public keys.

Figure 2:
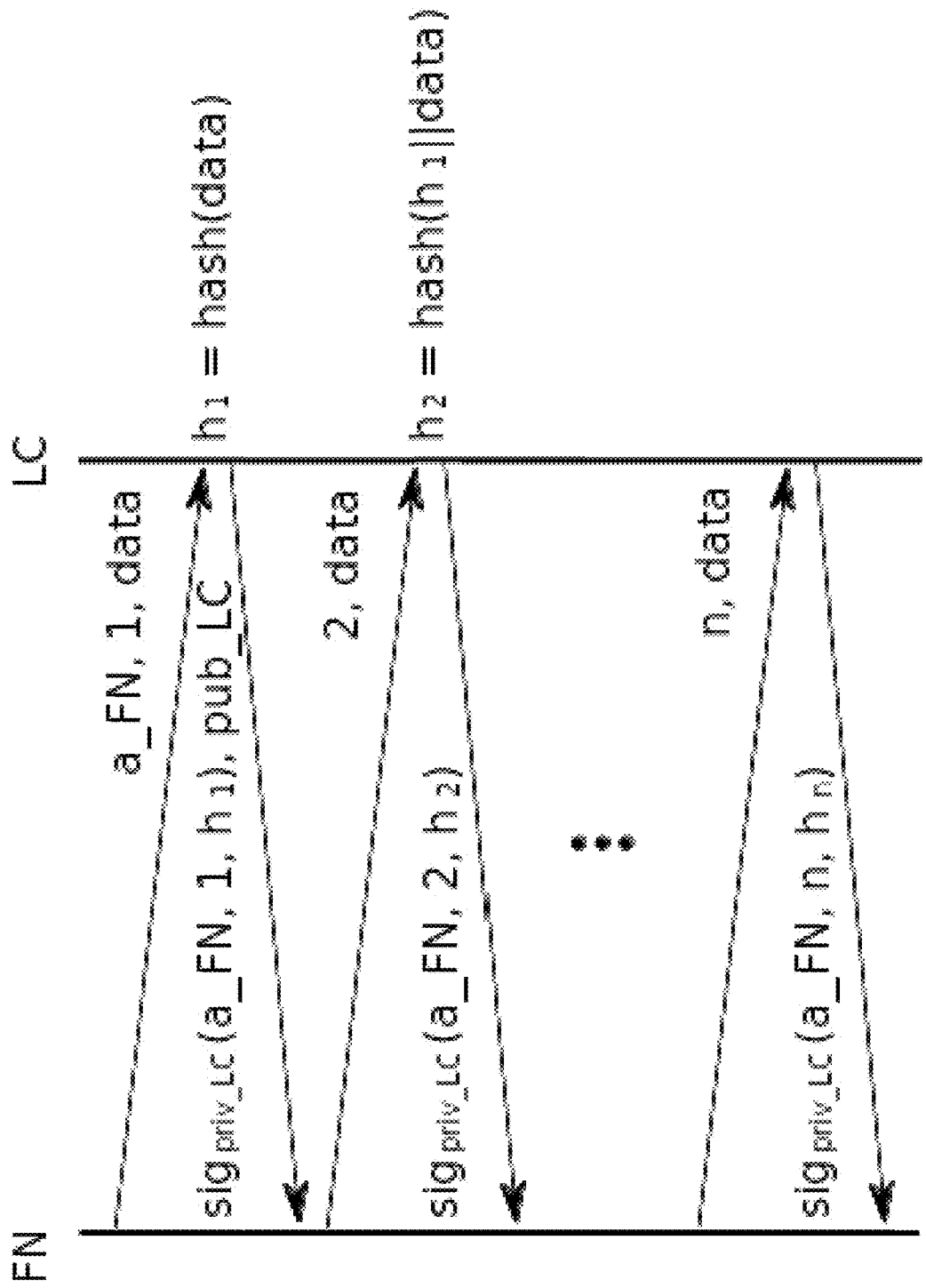
FIG. 2 schematically shows an exchange of data and acknowledgements between full nodes and light clients in accordance with a fair exchange protocol of an embodiment of the present invention.

A fair exchange protocol according to an embodiment of the invention is depicted in FIG. 2. A full node FN first sends its address (a_FN) to the light client LC, together with a counter (initially set to 1) and some data relating to a transaction which meets the terms of the smart contract SC. Then, the light client LC computes a hash $h_1$ of the previous hash, which in this case can be an empty string, concatenated with the data. The light client LC signs the blockchain address of the full node FN, the counter, and the hash value $h_1$ with its private key (priv_LC). This is referred to herein as a signed acknowledgement. In the first message or with the first signed acknowledgment, the light client LC also specifies its public key (pub_LC).

The full node FN checks that the public key (pub_LC) corresponds to the client's blockchain address, and that the signature ($sig_{priv\_LC}$(a_FN, 1, $h_1$)) is valid. The full node FN further verifies that the hash value $h_1$ in the signed acknowledgement is the hash of the data sent, and that the value of the counter is correct. Only then will the full node FN send the next piece of data with a subsequent counter value.

Thereafter, the light client LC computes the hash $h_2$ as a hash of the previous hash $h_1$ concatenated with the next piece of data. As before, the full node FN checks that the public key (pub_LC) corresponds to the client's blockchain address, the signature ($sig_{priv\_LC}$(a_FN, 2, $h_2$)) is valid, the hash value $h_2$ in the signed acknowledgement is the hash of the previous hash $h_1$ concatenated with the most recent data sent, and that the value of the counter is correct before sending the next piece of data with a further subsequent counter value.

The above steps can be repeated with the counters in the acknowledgements indicating a number of transactions for which the full node FN should receive value. The hashing results in a timestamped history of the data sent. In other embodiments, other fair exchange protocols ensuring a fair exchange could be applied as well so long as the protocol provides that a reward, such as money, for example, will be delivered if the content is delivered.

Smart Contract Implementation:

In the smart contract SC, there is a mapping from blockchain addresses to the full nodes FN [fullNodes: mapping (address⇒fullNode)], as well as a mapping for the light clients LC [lightClients: mapping(address⇒lightClient)]. In addition, the smart contract protocol performs the following functions:

fullNodeRegister( ): A fullNode object is created, and inserted into the fullNodes mapping, taking the sending address of the transaction as the key. The respective full node FN gets assigned a pseudorandom id.

lightClientRegister(filter, IP, servers): A lightClient object is created, and inserted into the lightClients mapping, taking the sending address of the transaction as the key. The light client LC gets assigned a pseudorandom id. The value associated with the transaction is added to the light client's balance. The servers field is set to indicate which full nodes FN are eligible to execute the contract (for example, based on particular, preferred servers of the light client LC, previously used servers or a pseudorandom id) and the following field for the light client is created: counters (address-⇒int), where each value is initially set to zero.

isAssigned(a_FN, a_LC): Returns true if and only if the respective full node FN given by its address is assigned to the given light client LC.

isAllowed(a_FN, a_LC): Returns isAssigned(a_FN, a_LC)//a FN ∈ lightClients[a_LC].servers.

addToBalance( ): Adds the value associated with the transaction to the light client's balance. The smart contract SC performs lightClients[a_LC].balance+=v, where a_LC is the sender of the transaction, and v the associated value.

claim(ACK, pub LC): The smart contract SC parses the acknowledgement (ACK) including the signature to extract the full node's address a_FN and the counter value n. The smart contract SC validates the signature using the light clients' public key pub_LC. Then, the smart contract SC computes the client's address a_LC based on it public key pub_LC, and checks that isAllowed(a_FN, a_LC). The smart contract SC further retrieves m=lightClients[a_LC].counters[a_FN], and checks that m>n. The smart contract SC transfers min(m-n, lightClients[a_LC].balance) from the client's balance to a full node FN, and sets lightClients[a_LC].counters[a_FN]=m.

Transaction Filtering:

In an embodiment of the present invention it is assumed that all transactions in a block are inserted into an authenticated data structure, which is committed to in the block header. This structure is referred to as a transaction tree.

Figure 3:
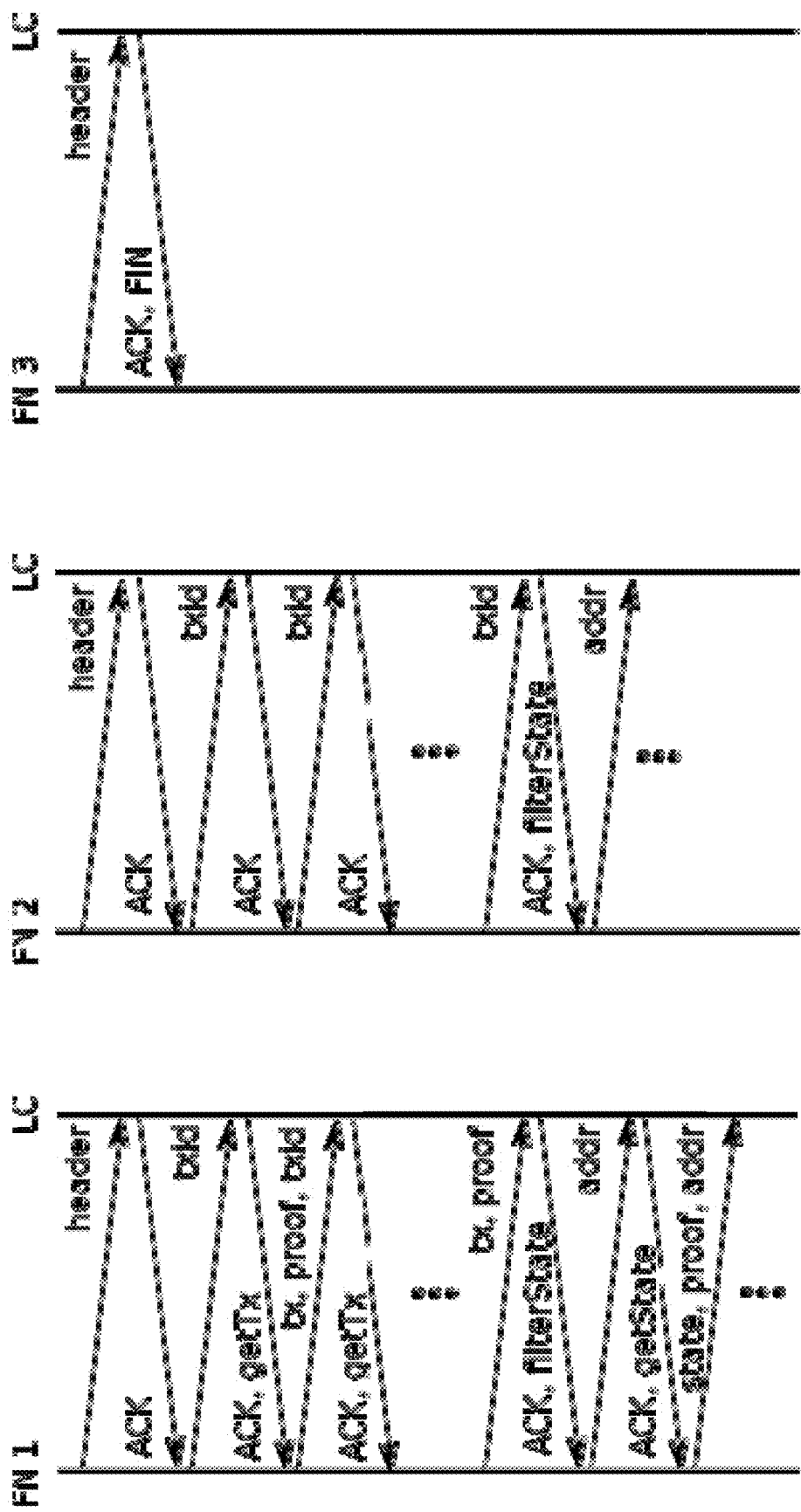
FIG. 3 schematically shows communications between the full nodes and the light clients in accordance with a transaction filtering protocol of an embodiment of the present invention.

FIG. 3 illustrates a fair transaction filtering protocol according to an embodiment of the present application. For each new block, assigned full nodes FN send the header to light clients LC. Then, the full nodes FN announce matching transactions by their transaction hash (txid). Light clients C can query for the full transaction (getTx). Each received message is acknowledged by light clients LC (ACK), as discussed above. If a light client LC does not respond with an acknowledgement (ACK), or sends a (FIN) message indicating that light client LC would like to abort the process, the full node FN stops serving this light client LC.

Optional State Filtering:

In addition to matching transactions in new blocks, light clients LC can preferably inquire about the blockchain state of their accounts, including the balance of their accounts. Additionally, the light clients LC can learn about past transactions. Light clients LC can request full nodes FN to filter the blockchain state for them (filterState). According to embodiments of the present invention, two types of blockchains are distinguished: those that organize account states and those which do not have an account state, as described in the following.

The first type of blockchains organize account states in authenticated data structures indexed by the accounts' addresses. This is referred to as a state tree. One example of such indexed, authenticated data structures is a Merkle Patricia Tree described at <<https://github.com/ethereum/wiki/wiki/>> (accessed: Sep. 6, 2016), the entirety of which is hereby incorporated herein by reference. Block headers contain a commitment to this data structure, and thus to each account state. Full nodes FN reply to filterState by sending matching addresses (addr), for which the light clients LC can query the state (getState) with the account state of each matching address (state), together with a proof of this state in the state tree (proof).

The second type of blockchains do not have an account state. Instead, the balance of each account is implicitly given by all Unspent Transaction Outputs (UTXOs) sent to the account. In this situation, light clients LC are susceptible to transaction withholding attacks. Full nodes FN could omit some transactions, and light clients would not learn that certain outputs are not in the UTXO set anymore.

According to an embodiment of the invention, the method allows light clients LC to learn their correct balance, provided that the light clients LC are connected to at least one honest full node FN. Communication between full nodes FN and light clients LC is done as described above: full nodes FN send single messages, which light clients LC acknowledge.

The full nodes FN organize the state of the second type of blockchains by grouping elements in the UTXO set by their addresses. For each address a having UTXOs, the full nodes FN compute the set of the corresponding outpoints ($u_a$). An outpoint for an output is defined as a pair, consisting of the hash of the transaction including the output, and the output's index in the transaction. Further, the full nodes FN compute a hash ($h_a$) of the outpoints. Full nodes FN maintain a mapping from addresses a appearing in the UTXO set to the corresponding hashes $h_a$.

According to one embodiment, the method comprises:
1. Connected full nodes FN filter all addresses appearing in the current UTXO set;
2. The full nodes FN compute a Merkle Patricia Tree, using the matched addresses as keys, and the corresponding hashes as values;

3. The full nodes FN compute a hash of the root node of the resulting tree, and send this value to the light client LC;
4. Let c be a root node hash, which has been announced the most often. Let n be an arbitrary full node which announced c:
   a) The light client LC downloads the $(a, h_a)$ pairs from n, which the full node FN used to compute the Merkle Patricia Tree;
   b) The light client LC checks that each address a matches its filter;
   c) The light client LC recomputes the Merkle Patricia Tree with the given pairs;
   d) The light client LC computes the hash of the resulting root node, and compares it against c;
   e) For each a, the light client LC downloads the set $u_a$;
   f) For each a, the light client LC recomputes the hash of $u_a$, and compares it against $h_a$;
   g) For each outpoint in $u_a$, the light client LC downloads the transaction including the corresponding output from n. The light client LC verifies that the transactions correspond to the hashes in the outpoints;
   h) For each such transaction, the light client LC downloads the transaction inclusion proof from n, and verifies it;
   i) For each outpoint in $u_a$, the light client LC extracts the corresponding output from the including transaction. The light client LC checks that each output is sent to a;
   j) If any of the above checks fail, the light client LC disconnects from n, and repeats Step 4;
5. CONFLICT RESOLUTION: As applicable, let m be a full node FN, which announced a root hash $c' \neq c$. The light client LC now does a depth-first search for the first difference in the included $(a, h_a)$ pairs. The following cases may arise:
   a) m provides an invalid Merkle Patricia Tree branch:
      i. The light client disconnects from m, and repeats Step 5;
   b) The Merkle Patricia Tree built by m contains an address a, which n's tree does not include: CHALLENGING m:
      i. The light client LC checks that a matches its filter;
      ii. The light client LC downloads $u_a$ and $h_a$ from m;
      iii. The light client LC recomputes the hash of $u_a$, and compares it against $h_a$;
      iv. For each outpoint in $u_a$, the light client LC downloads the transaction including the corresponding output from m. The light client LC verifies that the transactions corresponds to the hashes in the outpoints;
      v. For each such transaction, the light client LC downloads the transaction inclusion proof from n, and verifies it;
      vi. For each outpoint in $u_a$, the light client LC extracts the corresponding output from the including transaction. The light client checks that each output is sent to a;
      vii. If any of the above checks fail, the light client LC disconnects from m, and repeats Step 5;
      viii. The light client LC asks n to prove that any of the outputs referenced by $u_a$ has already been spent;
      ix. If n succeeds, i.e., provides a transaction including such an output, together with a transaction inclusion proof, the light client disconnects from m, and repeats Step 5;
      x. Otherwise, the light client disconnects from n, and repeats Step 4;
   c) n's tree contains an address a, which m's tree does not include: CHALLENGING n:
      i. Let $u_a$ be the outpoints that n included, for address a;
      ii. The light client LC asks m to prove that any of the outputs referenced by $u_a$ has already been spent;
      iii. If m succeeds, i.e., provides a transaction including such an output, together with a transaction inclusion proof, the light client LC disconnects from n, and repeats Step 4;
      iv. Otherwise, the light client disconnects from m, and repeats Step 5;
   d) The trees by m and n have a different value $h_a$, for some address a:
      i. CHALLENGING m is performed, wherein the step of checking that the address matches the filter can be omitted.

In each iteration of CONFLICT RESOLUTION, one misbehaving node is detected by the light client LC, and removed.

Where all connected full nodes FN are honest and follow the protocol, the method is efficient in terms of computation. In particular, the method advantageously avoids the full nodes FN having to independently filter all past transactions for each light client LC. Therefore, in addition to providing increased privacy and security and allowing to determine misbehaving nodes as described above, embodiments of the invention also advantageously result in faster computational processing, thereby freeing up resources for larger blockchains and further transactions.

Embodiments of the method are also efficient in terms of bandwidth consumption. In particular, where all full nodes FN are honest, a light client LC can download the root hash from all of them. Thereafter, all other data is then only downloaded from a single full node FN.

Different embodiments of the present invention comprise different combinations of some of the foregoing steps, and computer systems implementing the method.

Some of the advantages of the present invention include:
1) The ability to execute transaction filtering services using smart contracts that are running in the blockchain in order to mediate/broker the outsourcing of Bloom filters and Cuckoo filters to regular blockchain nodes;
2) The ability to use the fair exchange protocol to generate receipts of the service and reward full nodes in proportion to the amount of their work through the smart contract; and/or
3) The ability to construct a UTXO tree and use conflict resolving protocol from multiple full nodes to retrieve the correct state of clients' accounts in blockchains that do not support state storage in the ledger.

According to an embodiment, a method of providing a transaction forwarding service comprises:
1) The light client LC invokes a smart contract SC in the blockchain specifying the full nodes FN that will execute the smart contract SC, and the particulars of the filter, including type, that should be used when forwarding transactions. The light client LC also preferably specifies the reward for running the contract;
2) Full nodes FN execute the smart contract SC to check whether they are eligible to run the smart contract SC;

3) A full node FN forwards a new transaction that matches the filter, along with its block-inclusion proof, to the light client LC;

4) The light client LC verifies the forwarded transaction, and sends back a signed sequential acknowledgement as the receipt; and 5) The full node FN sends the latest receipt (with the highest sequential number) to the smart contract SC in order to collect its reward.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of privacy-enabled data communication in a blockchain network, the blockchain network comprising a plurality of full nodes storing a blockchain and a light client, the method comprising:
   a) determining, by a respective full node of the full nodes, whether the respective full node is eligible to forward data to a respective light client based on a respective computer code indicating eligible full nodes, a filter of the respective light client, and a predetermined numerical value;
   b) determining, by the respective full node, a respective data entry in the blockchain that matches the filter;
   c) forwarding, by the respective full node, data relating to the respective data entry that matches the filter of the respective light client to the respective light client with a proof that the respective data entry is included in the blockchain;
   d) receiving, by the respective full node, a signed acknowledgement from the respective light client verifying the data entry; and
   e) executing a claim protocol, by the respective full node, based on the received acknowledgement and the predetermined numerical value, the claim protocol comprising transferring a portion of a value associated with a balance entry associated with the respective light client to a balance entry associated with the respective full node.

2. The method according to claim 1, wherein steps b) through d) are sequentially repeated with the acknowledgements comprising a counter indicating a number of times steps b) through d) have been repeated, and wherein executing the claim protocol comprises determining the portion of the value based upon the number of the acknowledgements in accordance with a fair exchange protocol.

3. The method according to claim 2, wherein, prior to each sequential repetition of step b), the respective full node verifies that the signature is valid and that a hash value in the respective signed acknowledgement from a previous iteration of step d) corresponds to a hash of a previous hash value concatenated with the data relating to the respective data entry sent in a previous iteration of step c).

4. The method according to claim 2, wherein the respective full node sends its address and a counter along with the data in each iteration of step c) and verifies that the counter has been incremented in each of the acknowledgements received in step d).

5. The method according to claim 2,
   wherein the steps b) through d) have been repeated at least once producing a previous respective data entry, a previous signed acknowledgement, a current respective data entry and a current receptive acknowledgement, and a current counter, and
   wherein the current signed acknowledgement comprises an acknowledgement signed with a private key of the respective light client, the acknowledgement comprising a blockchain address of the respective full node, the current counter, and a current hash, the current has comprising a previous hash of the data related to the previous respective data entry concatenated with the current respective data entry.

6. The method according to claim 1, wherein the method is performed by a plurality of full nodes, the method further comprising detecting a misbehaving one of the full nodes.

7. The method according to claim 6, wherein detecting the misbehaving one of the full nodes comprises:
   building, by each of the full nodes, a Merkle Patricia Tree using Unspent Transaction Outputs (UTXOs) of one or more accounts of the respective light client; and
   determining whether root hashes of the respective Merkle Patricia Trees differ from one another.

8. The method according to claim 1, further comprising, prior to step a), receiving the respective computer code indicating the eligible full nodes, the filter and the predetermined numerical value from the respective light client.

9. The method according to claim 1, wherein the computer code specifies the eligible full nodes based on pseudorandom identifications and step a) is performed using the pseudorandom identifications.

10. The method according to claim 1,
    wherein the computer code comprises a register associating registered full nodes to registered light clients,
    wherein the respective full node determines it is eligible by determining whether it is associated with the respective light client in the register, and
    wherein the filter is a privacy preserving filter comprising an obfuscated representation of a blockchain address,
    wherein the respective data entry corresponds to a data entry in the blockchain at the blockchain address.

11. A full node in a blockchain network, the full node comprising:
    a processor and a memory, the memory comprising a blockchain and processor executable instructions that, when executed by the processor, cause the full node to be configured to:

a) determine whether the full node is eligible to forward data to a respective light node in the blockchain network based on a respective computer code indicating eligible full nodes of the blockchain network, a filter of the respective light client in the blockchain network, and a predetermined numerical value;
b) determine a respective data entry in the blockchain that matches the filter;
c) forward data relating to the respective data entry that matches the filter of the respective light client to the respective light client with a proof that the respective data entry is included in the blockchain;
d) receive a signed acknowledgement from the respective light client verifying the data entry; and
e) execute a claim protocol based on the received acknowledgement and the predetermined numerical value, the claim protocol comprising transferring a portion of a value associated with a balance entry associated with the respective light client to a balance entry associated with the respective full node.

12. The system according to claim 11, wherein the full node is further configured to sequentially repeat steps b) through d) with the acknowledgements comprising a counter indicating a number of times steps b) through d) have been repeated, and wherein executing the claim protocol comprises determining the portion of the value based upon the number of acknowledgements in accordance with a fair exchange protocol.

13. The system according to claim 12, wherein, prior to each sequential repetition of step c), each of the full node is further configured to verify that the signature is valid and that a hash value in the respective signed acknowledgement from a previous iteration of step d) corresponds to a hash of a previous hash value concatenated with the data relating to the respective transaction sent in a previous iteration of step c).

14. The system according to claim 12, wherein each of the full nodes is further configured to send its address and a counter along with the data in each iteration of step c) and verify that the counter has been incremented in each of the acknowledgements received in step d).

15. The system according to claim 11, wherein the full node is further configured to build a Merkle Patricia Tree using Unspent Transaction Outputs (UTXOs) of one or more accounts of the respective light client, and to detect a misbehaving one of the full nodes based on root hashes of the respective Merkle Patricia Trees differing from one another.

16. The system according to claim 11, further comprising the full node being configured to receive the compute code from the respective light client.

17. A tangible, non-transitory computer-readable medium having instructions thereon which, when executed by at least one server that stores or has access to a blockchain of a blockchain network, provides for execution of the following steps:
a) determining whether a respective full node of the blockchain network associated with the server is eligible forward data to a respective light client of the blockchain network based on a respective computer code indicating eligible full nodes, a filter of a respective light client, and a predetermined numerical value;
b) determining a respective data entry in the blockchain that matches the filter;
c) forwarding data relating to the respective data entry that matches the filter of the respective light client to the respective light client with a proof that the respective data entry is included in the blockchain;
d) receiving a signed acknowledgement from the respective light client verifying the respective data entry; and
e) executing a claim protocol based on the received acknowledgement and the predetermined numerical value, the claim protocol comprising transferring a portion of a value associated with a balance entry associated with the respective light client to a balance entry associated with the respective full node.

* * * * *